United States Patent [19]

Elings et al.

[11] Patent Number: 5,412,980
[45] Date of Patent: May 9, 1995

[54] TAPPING ATOMIC FORCE MICROSCOPE

[75] Inventors: Virgil B. Elings; John A. Gurley, both of Santa Barbara, Calif.

[73] Assignee: Digital Instruments, Inc., Santa Barbara, Calif.

[21] Appl. No.: 926,175

[22] Filed: Aug. 7, 1992

[51] Int. Cl.$^6$ .................................. G01B 7/34
[52] U.S. Cl. .................................. 73/105; 250/306
[58] Field of Search .............. 73/105, 579; 250/306, 250/307

[56] References Cited

U.S. PATENT DOCUMENTS

| | | | |
|---|---|---|---|
| 2,405,133 | 8/1946 | Brown | 73/105 |
| 2,460,726 | 2/1949 | Arndt, Jr. | 73/105 |
| 3,049,002 | 8/1962 | Hediger | 73/105 |
| 3,378,648 | 4/1968 | Fenner | 179/100.41 |
| 4,106,333 | 8/1978 | Saljé et al. | 73/105 |
| 4,359,892 | 11/1982 | Schnell et al. | 73/105 |
| 4,724,318 | 2/1988 | Binnig | 250/306 |
| 4,868,396 | 9/1989 | Lindsay | 250/440.1 |
| 4,902,892 | 2/1990 | Okayama et al. | 250/307 |
| 4,935,634 | 6/1990 | Hansma et al. | 250/560 |
| 5,015,850 | 5/1991 | Zdeblick et al. | 250/306 |
| 5,162,653 | 11/1992 | Hosaka et al. | 250/306 |
| 5,186,041 | 2/1993 | Nyyssonen | 73/105 |
| 5,189,906 | 3/1993 | Elings et al. | 73/105 |
| 5,212,987 | 5/1993 | Dransfeld et al. | 73/105 X |
| 5,224,376 | 7/1993 | Elings et al. | 73/105 |
| 5,229,606 | 7/1993 | Elings et al. | 250/306 |
| 5,237,859 | 8/1993 | Elings et al. | 73/105 |
| 5,266,801 | 11/1993 | Elings et al. | 250/306 |
| 5,345,815 | 9/1994 | Albrecht et al. | 73/105 |
| 5,363,697 | 11/1994 | Nakagawa | 73/105 |

FOREIGN PATENT DOCUMENTS

| | | |
|---|---|---|
| 1270132 | 6/1990 | Canada . |
| 62-130302 | 6/1987 | Japan . |
| 1504485 | 8/1989 | U.S.S.R. . |
| WO92/12398 | 7/1992 | WIPO . |

OTHER PUBLICATIONS

Binnig et al., "Atomic Force Microscope", Physical Review Letters vol. 56, No. 9, 3 Mar. 1986, pp. 930-933.
"A Batch-Fabricated Silicon Accelerometer," Lynn Michelle Roylance, IEEE Transactions on Electron Devices, vol. ED-26, No. 12, Dec. 1979, pp. 1911-1917.
"Potentiometry for Thin-Film Structures Using Atomic Force Microscopy", J. Vac. Scl. Technol. vol. 8, No. 1, Jan./Feb. 1990; pp. 394-399, Anders et al.
"Pressure Sensors Selection Guide PC Board Mountable", ICSENSORS Milpitas, Calif., TO-8 Series 1 page published by Dec. 1992.
"Force Measurement Using an AC Atomic Force Microscope", William A. Ducker, et al., J. Appl Phys. 67 (9), 1 May 1990, New York pp. 4045-4052.
Y. Martin et al., "atomic force microscope-force mapping and profiling on a sub 100-521 scale", J. Appl. Phys. 61 (10), 15 May 1987, pp. 4723-4729.
N. Umeda et al., "Scanning attractive force microscope using photothermal vibration", J. Vac. Sci. Technol. B 9 (2), Mar./Apr. 1991, pp. 1318-1322.
A. L. Weisenhorn et al., "Forces in atomic force microscopy in air and water", Appl. Phys. Lett. 54 (26), 26 Jun. 1989, pp. 2651-2653.

(List continued on next page.)

Primary Examiner—Tom Noland
Attorney, Agent, or Firm—Oblon, Spivak, McClelland, Maier & Neustadt

[57] ABSTRACT

An atomic force microscope in which a probe tip is oscillated at a resonant frequency and at amplitude setpoint and scanned across the surface of a sample in contact with the sample, so that the amplitude of oscillation of the probe is changed in relation to the topography of the surface of the sample. The setpoint amplitude of oscillation of the probe is greater than 10 nm to assure that the energy in the lever arm is much higher than that lost in each cycle by striking the sample surface, thereby to avoid sticking of the probe tip to the sample surface. Data is obtained based either on a control signal produced to maintain the established setpoint or directly as a function of changes in the amplitude of oscillation of the probe.

28 Claims, 7 Drawing Sheets

OTHER PUBLICATIONS

Hobbs et al., "Atomic Force Microscope: Implementations", SPIE Vo. 897, Scanning Microscopy Tech. & Applns (1988) pp. 26–30.

Umemura et al., "High Resolution Images . . . Force Microscope", Jpn. J. Appl. Phys. vol. 32 (Nov. 1993), Pt. 2, No. 11B pp. L1711–L1714.

"AutoProbe XL2" data sheet, Park Scientific Instruments and related advertisements. 3 pages (2nd two illegible) by Oct. 1994.

B. Giambattista et al., "Atomic resolution images of solid–liquid interfaces", Proc. Natl. Acad. Sci. USA, vol. 84, pp. 4671–4674, Jul. 1987.

R. Erlandsson et al., "Atomic Force Microscopy Using Optical Interferometry" J. Vac. Sci. Technol. A6(2), Mar./Apr. 1988, pp. 266–270.

"Rapid Measurement of Static and Dynamic Surface Forces", William A. Ducker et al, IBM Research Div., T. J. Watson Research Ctr., Yorktown, Hghts., N.Y., pp. 2408–2410 Applied Physics Letters, vol. 56, No. 24, Jun. 11, 1990.

"A Scanning Force Microscope Designed for Applied Surface Studies", Ragnar Erlandsson, et al; Microscopy, Microanalysis, Microstructures, pp. 471–480, Oct./Dec., 1990, No. 5/6.

T. R. Albrecht et al., "Frequency modulation detection using high-Q cantilevers for enhanced . . . ", J. Appl. Phys. 69 (1991) 15 Jan., No. 2, pp. 668–673 N.Y., U.S.

Dror Sarid et al., "Review of scanning force microscopy", J. Vac. Sci. Technol. B9 (2), Mar./Apr. 1991, pp. 431–437.

IBM Technical Disclosure Bulletin, vol. 32, No. 7, 7 Dec. 1989, New York, U.S., p. 168 "Microprobe–Based CD Measurement Tool".

TAPPING ATOMIC FORCE MICROSCOPE

BACKGROUND OF THE INVENTION

Field of the Invention

This invention relates to an ultra-low force atomic force microscope, and particularly an improvement to the atomic force microscope described in related commonly owned U.S. patent application Ser. No. 07/361,545 filed Jun. 5, 1989.

Discussion of the Background

Atomic Force Microscopes (AFM's) are extremely high resolution surface measuring instruments. Two types of AFM's have been made in the past, the contact mode (repulsive mode) AFM and the non-contact (attractive mode) AFM.

The contact mode AFM is described in detail in U.S. Pat. No. 4,935,634 by Hansma et al, as shown in FIG. 2. This AFM operates by placing a sharp tip attached to a bendable cantilever directly on a surface and then scanning the surface laterally. The bending of the lever in response to surface height variations is monitored by a detection system. Typically, the height of the fixed end of the cantilever relative to the sample is adjusted with feedback to maintain the bending at a predetermined amount during lateral scanning. The adjustment amount versus lateral position creates a map of the surface. The deflection detection system is typically an optical beam system as described by Hansma et al. Using very small microfabricated cantilevers and piezoelectric positioners as lateral and vertical scanners, AFM's can have resolution down to molecular level, and may operate with controllable forces small enough to image biological substances. Since AFM's are relatively simple, inexpensive devices compared to other high resolution techniques and are extremely versatile, they are becoming important tools in a wide variety of research and high technology manufacturing applications. The contact mode AFM, in which the tip is maintained in continuous contact with the sample, is currently the most common type, and accounts for essentially all the AFM's sold commercially to date.

The contact AFM has found many applications. However, for samples that are very soft or interact strongly with the tip, such as photoresist, some polymers, silicon oxides, many biological samples, and others, the contact mode has drawbacks. As pointed out in Hansma et al, the tip may be attracted to the surface by the thin liquid layer on all surfaces in ambient conditions, thus increasing the force with which the tip presses on the surface. The inventors and others have also observed that electrostatic forces may attract the tip to the surface, particularly for some tipsample combinations such as silicon nitride tips on silicon oxide surfaces. When the tip is scanned laterally under such conditions, the sample experiences both compressive and shearing forces. The lateral shearing forces may make the measurement difficult and for soft samples may damage the sample. Further, a stick-slip motion may cause poor resolution and distorted images. Hansma et al's approach to this problem was to immerse the tip, cantilever, and sample surface in liquid, thus eliminating the surface layer forces, and for a polar liquid, the electrostatic forces. This technique works very well, and has the further advantage that it allows samples that are normally hydrated to be imaged in their natural state. However for many samples and applications, immersion in liquid is not of much use. Operating in liquid requires a fluid cell and increases the complexity of using the AFM, and for industrial samples such as photoresist and silicon wafers, immersion is simply not practical.

The non-contact AFM, developed by Martin et al, *J. Applied Physics*, 61(10), 15 May, 1987, profiles the surface in a different fashion than the contact AFM. In the non-contact AFM, the tip is scanned above the surface, and the very weak Van der Waals attractive forces between the tip and sample are sensed. Typically in non-contact AFM's, the cantilever is vibrated at a small amplitude and brought near to the surface such that the force gradient due to interaction between the tip and surface modifies the spring constant of the lever and shifts its natural resonant frequency. The shift in resonance will change the cantilever's response to the vibration source in a detectable fashion. Thus the amount of change may be used to track the surface typically by adjusting the probe surface separation during lateral scanning to maintain a predetermined shift from resonance. This AC technique provides greater sensitivity than simply monitoring the DC cantilever deflection in the presence of the attractive Van der Waals force due to the weak interaction between the tip and surface. The frequency shift may be measured directly as proposed by Albrecht et al, *J. Applied Physics*, 1991, or indirectly as was done originally by Martin et al.

The indirect method uses a high Q cantilever, such that damping is small. The amplitude versus frequency curve of a high Q lever is very steep around the resonant frequency. Martin et al oscillated the lever near the resonant frequency and brought the tip close to the surface. The Van der Waals interaction with the surface shifts the resonance curve. This has the effect of shifting the resonance closer or further to the frequency at which the lever is oscillated, depending on which side of resonance the oscillation is at. Thus, indirectly, the amplitude of oscillation will either increase or decrease as a consequence of the resonance shift. The amplitude change is measurable (AM type detection). This change in amplitude close to the surface compared to the amplitude far away from the surface (the free amplitude) can be used as a setpoint to allow surface tracking. The direct method measures the frequency shift itself (FM type detection). Both methods are bound by the same interaction constraints.

FIG. 5 illustrates this non-contact operation. The tip is driven at a known amplitude and frequency of oscillation, which is typically near a cantilever resonance. The amplitude of this oscillation is detected by a deflection detector, which can be of various types described in the references. When the tip is sufficiently far away from the surface, it will oscillate at the free amplitude, $A_o$, as shown in FIG. 5. As shown in FIG. 5, when the tip is brought closer to the surface, the Van der Waals interaction will shift the resonant oscillatory frequency slightly. This shift causes either an increased or decreased amplitude, $A_S$, or the frequency shift may be measured directly. This modified amplitude value may be used as a setpoint in the manner of other above described SPM's, such that as the tip is scanned laterally, the tip height may be adjusted with feedback to keep setpoint, $A_S$, at a constant value. Thus an image of the surface may be generated without surface contact, and without electrical interaction as needed by a scanning tunnelling microscope STM. The resonant shift may also be caused by other force interactions, such as magnetic field interaction with a magnetic tip. Thus this type of AFM may in theory be easily configured to map a variety of parameters using the same or similar construction.

The Van der Waals force is very weak, and decreases rapidly with separation, so the practical furthest distance for measurable interaction is 10 nm above the surface, as shown in FIG. 1, taken from Sarid, *Scanning Force Microscopy*, Oxford University Press, 1991. To shift the resonance of the lever, the lever must oscillate within this envelope of measurable force gradient. If just a small portion of the oscillation is within the envelope, the resonance will not be appreciably affected. Thus the oscillation amplitude must be small. A compendium of all noncontact AFM research can be found in *Scanning Force Microscopy by Sarid*, above noted, no researcher was able to operate a non-contact AFM with a free oscillation amplitude of greater than 10 nm. This limitation as will be shown limits the usefulness of the non-contact method.

Although developed at essentially the same time as the contact AFM, the non-contact AFM has rarely been used outside the research environment due to problems associated with the above constraints. The tip must be operated with low oscillation amplitude very near the surface. These operating conditions make the possibility very likely of the tip becoming trapped in the surface fluid layer described by Hansma et al. This effect is illustrated in FIG. 6, an amplitude versus displacement curve. A cantilever with probe is oscillated at a free amplitude $A_o$, and the vertical position of the fixed end of the lever is varied from a height where the probe is not affected by the surface to a point where the probe is captured by the surface and oscillation ceases. The curve is typical for oscillation amplitudes of 10 nm or less. Such curves have been measured by the inventors, and were also described by Martin et al, and also by Ducker et al, in "Force Measurement Using an AC Atomic Force Microscope", *J. of Applied Physics*, 67(9), 1 May 1990. As the curve clearly shows, when the tip is brought near the surface there is a narrow region where the amplitude is affected by the Van der Waals interaction before it becomes abruptly captured by the surface fluid layer, and oscillation becomes very small. It is this narrow region in which the non-contact AFM must operate. As a surface is scanned, any variations in the surface topography may cause the tip to become captured if the feedback cannot perfectly respond to the topography variations. If the tip does become captured, the control system will lift the fixed end of the lever until the tip breaks free, and then re-establish the setpoint. As can be seen from FIG. 6, there is significant hysteresis in the withdraw process, which will cause serious instability in the image data. Thus non-contact microscopes must scan very slowly so the feedback loop has sufficient time to prevent the tip becoming stuck to the surface. Moreover, because the tip must be operated above the fluid layer, the lateral resolution is inferior to the contact mode. Typically, the non-contact AFM must operate with the tip 5–10 nm above the surface, which limits the lateral resolution to 5–10 nm. Contact mode AFM's typically have lateral resolution of better than 1 nm.

For measuring the frequency shift using amplitude detection, the sensitivity depends on the cantilever having a very sharp resonance peak, which in turn gives a very slow response time because undamped systems require a long time to recover from a perturbation. Thus, sensitivity and response time are inversely coupled. The high Q requirement also places restrictions on the design of the lever to minimize the effect of air as a damping agent. One could improve the time response by using cantilevers which may be operated at a higher frequency, but such levers are stiffer and therefore have reduced sensitivity to the Van der Waals interaction. Thus it can be seen that high sensitivity and fast response are very difficult to achieve with a non-contact AFM. Furthermore, the weak force interaction places restrictions on the height at which the tip may be operated and the amplitude of oscillation. The presence of the fluid layer near this height makes capture of a lever with a small oscillation likely, so slow time response is a serious stability problem. For these reasons, despite their many potential advantages, non-contact AFM's have yet to be successful commercially, The non-contact AFM has been used successfully in the measurement of magnetic fields on objects such as magnetic storage media. With a tip of, or coated with, magnetic material, the force interaction between the tip and magnetic sample is much stronger than the Van der Waals interactions, and is longer range. Thus, the non-contact FM (also called magnetic force microscope, MFM) may be operated without the need for ultra-high sensitivity, as required for surface profiling. However since magnetic fields are seldom continuous, some interaction is necessary to guide the tip over the surface between magnetic regions. Rugar et al, (Magnetic Force Microscopy, IBM Research Report, Almaden Research Center, Dec. 12, 1990) found that applying an electric field between the tip and sample would produce a larger effect than the Van der Waals force, so the hard disks could be scanned without the probe sticking to the surface. This method limits the technique to conductive surfaces.

SUMMARY OF THE INVENTION

Accordingly, one object of this invention is to provide a novel AFM that does not produce shear forces during scanning and does not have the operability limitations of the noncontact AFM.

A further object of the invention is to provide a novel AFM and method to profile surfaces, including soft or sticky surfaces, at high resolution with high sensitivity and fast time response, thus overcoming the drawbacks of prior art contact and non-contact mode AFM's.

It is a further object of this invention to provide an AFM that may map magnetic or other force distributions while retaining the ability to track topography without other force components.

These and other objects are achieved according to the present invention by providing a new and improved AFM and method of operating an AFM, wherein the probe is oscillated at or near resonance or a resonant harmonic to strike the surface of the sample, so that the tip has minimal lateral motion while in contact with the surface, thus eliminating scraping and tearing. The cantilever probe is oscillated at a large amplitude, greater than 10 nm, preferably greater than 20 nm, and typically on the order of 100–200 nm, so that the energy in the lever is large enough, much higher than that lost in each oscillation cycle due to, for example, damping upon striking the same surface, so that the tip will not become stuck to the surface. The oscillation amplitude is affected by the tip striking the surface in a measurable fashion, and this limited amplitude is a direct measure of the topography of the surface. Alternatively, a feedback control can be employed to maintain the oscillation amplitude constant, and then a feedback control signal can be used to measure surface topography. The striking interaction is strong, so the sensitivity is high. The resolution approaches the contact mode microscope because the tip touches the surface. The technique can use high frequency jumps with no loss in sensitivity since the measurement of the amplitude change does not depend on frequency.

The invention may be employed in the measure of magnetic or other force distributions in conjunction with the non-contact method, to track the surface in regions where there is no other force.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14a is an illustration of scanning a probe tip in a trench while oscillating the probe tip and FIG. 14b is a graph illustrating the observed oscillation amplitude resulting from the scanning of FIG. 14a.

DESCRIPTION OF THE PREFERRED EMBODIMENT

The Jumping Probe AFM, as described in the above-noted co-pending application Ser. No. 07/361,545, has the advantage that the only forces exerted on the sample are purely vertical or compressive and no shearing, tearing forces are applied. In practice, the elimination of shearing forces greatly extends the range of application of the AFM to a variety of soft or loosely fixed materials. However, the Jumping AFM also has a tendency to become stuck to the surface for most samples, and the pull-away part of the jump becomes difficult. The sticking is due to the probe tip getting trapped by surface tension in the surface fluid layer, and often it is extremely difficult to pull the probe free. Thus the amplitude of the required jump becomes very large, and there may be a significant delay between the pull-off motion and the tip actually breaking free, which causes difficulty in maintaining stable feedback control.

The inventors have discovered that if the probe is oscillated at or near one of the resonant frequencies of the lever, that in fact the probe tip has much less of a tendency to stick to the surface because a resonant system tends to remain in stable oscillation even if some damping exists. Thus the preferred embodiment of the present invention utilizes a resonant oscillation of the cantilever at sufficient oscillation amplitude to achieve the advantages described above without the probe becoming stuck to the surface. This preferred embodiment also provides many of the benefits of the non-contact AFM as described above.

Existing development of AFM's using oscillation of the probes has been directed at avoiding surface contact, as described above, and as such is limited in practicality despite the potential advantages of the technique. For applications where the non-contact mode is desired, the inventors have found that the amplitude-distance of FIG. 6 can of be of great aid in establishing the setpoint for noncontact mode operation. Using the amplitude-distance curve, one can optimize the operating frequency, free amplitude and setpoint to achieve the most suitable operating characteristics for a particular sample and cantilever combination. This novel application of the curve was clearly not anticipated by Ducker or Martin. Using the computational and display capabilities of typical scanning probe microscopes, SPM's, the lever may be oscillated and the lever vertical position varied, while the curve is displayed on a terminal. The various parameters may be varied, such that desired operating conditions may be determined, and used when the SPM is in the imaging mode.

Figure 6:
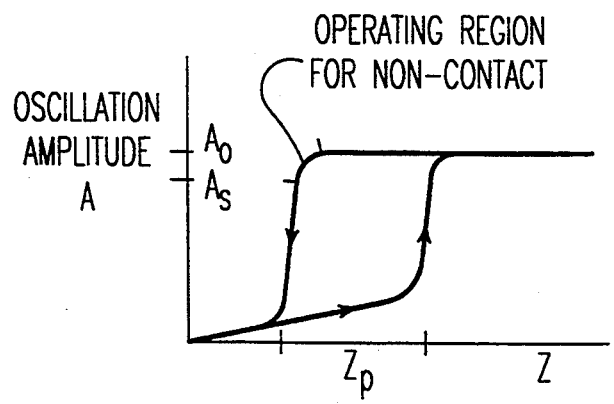
FIG. 6 is a graph of an amplitude rs. position curve that illustrates the behavior of the probe oscillation in a prior art non-contact mode AFM as a function of probe height above a surface.

The present invention is an AFM that does not avoid contact with the surface. Thus, the invention is not limited in the amplitude of oscillation, and in fact as will be shown, very large amplitudes compared to the non-contact mode are advantageous. In FIG. 6, it is shown that for small oscillation amplitudes as the tip is brought near the surface, it becomes trapped by the fluid layer and oscillation ceases abruptly. If the oscillation amplitude is larger, greater than 10 nm, preferably greater than 20 nm and typically 100–200 nm, then the energy in the oscillation may be sufficient in most cases to overcome the stickiness of the surface for a wide range of vertical positions of the lever.

Figure 7:
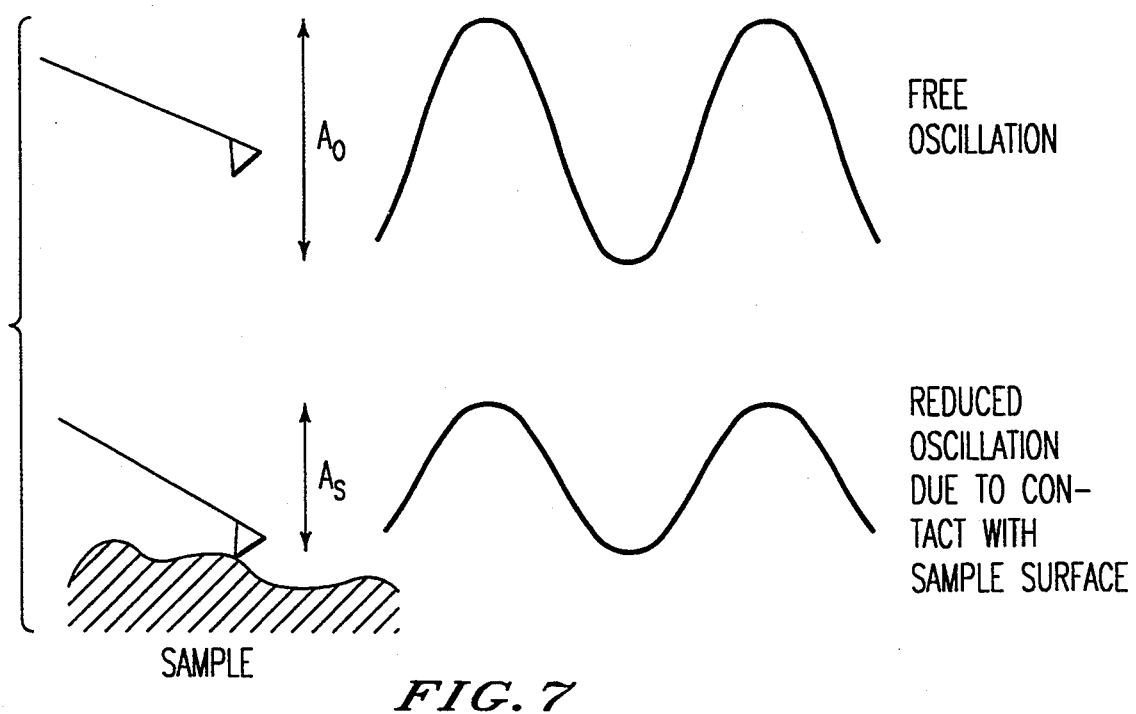
FIG. 7 is an illustration of the operation of a vibrating lever brought close to a surface in a preferred embodiment of the present invention.
Figure 8:
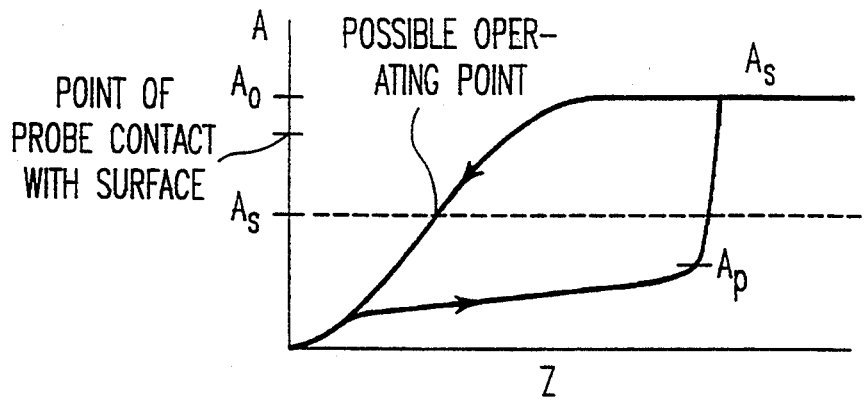
FIG. 8 is a graph of an amplitude vs. position curve that illustrates the behavior of the probe oscillation in a preferred embodiment of the present invention as a function of probe height above a surface.

FIG. 7 shows that for a large free amplitude, $A_o$, the lever may be brought down to where the tip strikes the surface. The energy lost by striking the surface and overcoming the fluid layer attraction limits the oscillation to a reduced value, $A_s$, but does not stop the oscillation as happens for low drive oscillation amplitudes. The difference in behavior for higher amplitude oscillations is illustrated in FIG. 8 where the curve of FIG. 6 is duplicated for a free amplitude, $A_o$, of greater than 10 nm. As can be seen, there is wide range of limited amplitudes, with the probe striking the surface, that could be used as an operating point for a feedback loop. Abrupt capture of the probe does not take place, so stable operation is possible. As the curve shows, the lever may be further lowered such that oscillation is stopped. The withdraw characteristics are similar to the low amplitude case in that the amplitude increases gradually until a point is reached where the cantilever breaks free and resumes oscillation at the free amplitude.

Figure 1:
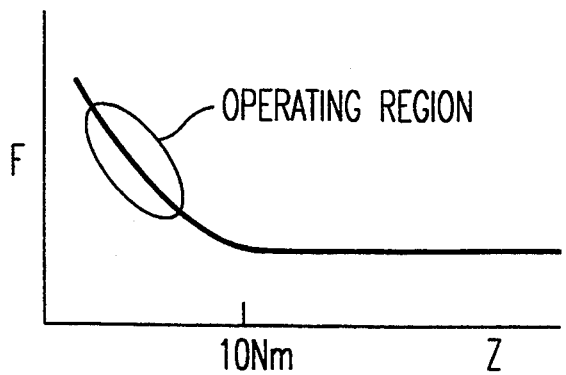
FIG. 1 is a graph showing the Van der Waals force as a function of height above a surface, and where a non-contact mode microscope must operate.
Figure 5:
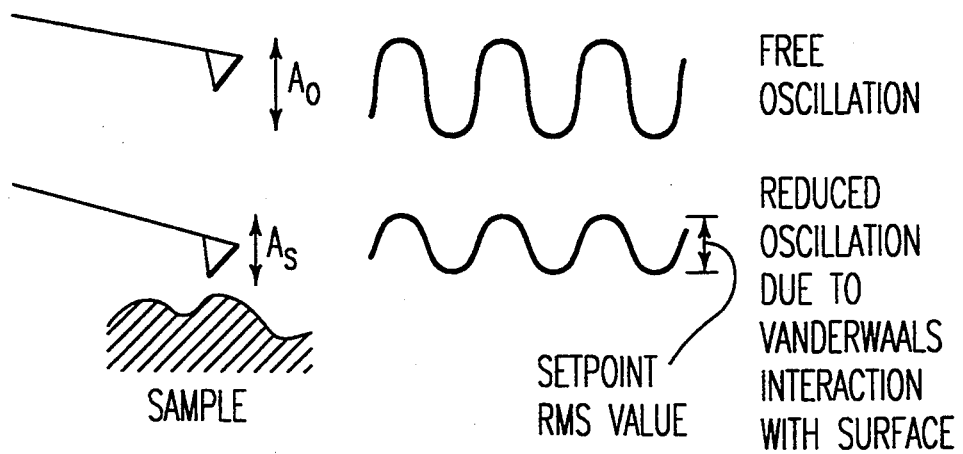
FIG. 5 is an illustration of the operation of a vibrating lever brought close to a surface in the prior art non-contact mode.
Figure 3:
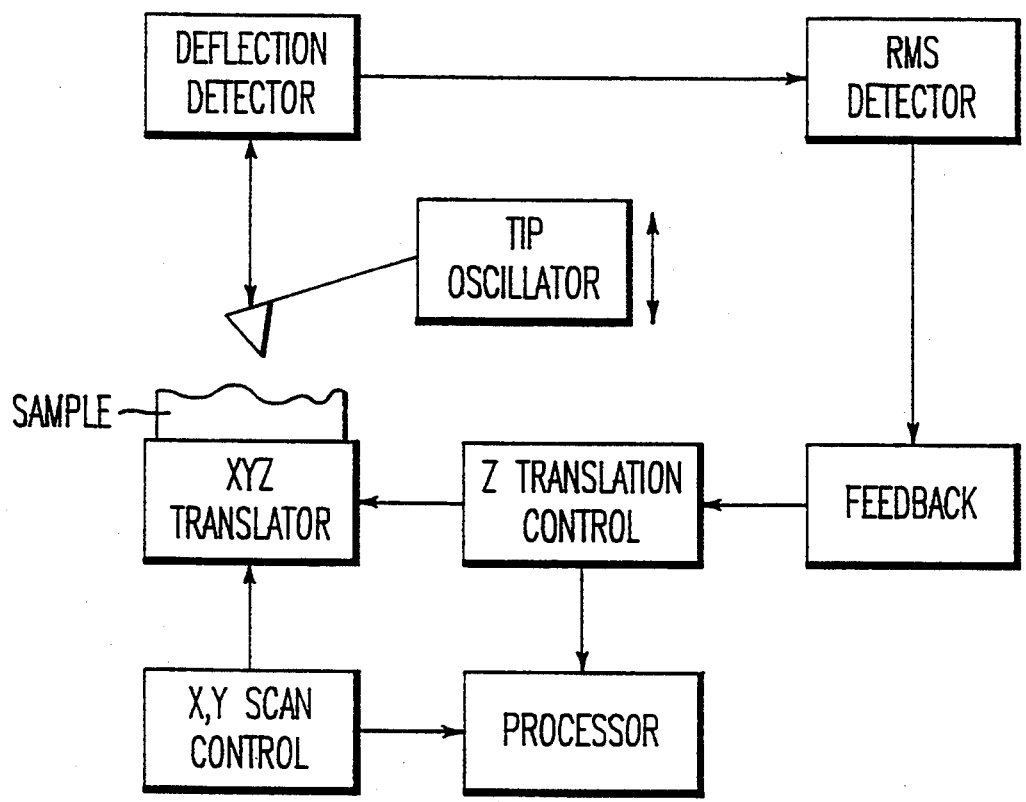
FIG. 3 is a simplified functional block diagram of the probe positioning apparatus of an atomic force microscope incorporating the present invention.
Figure 2:
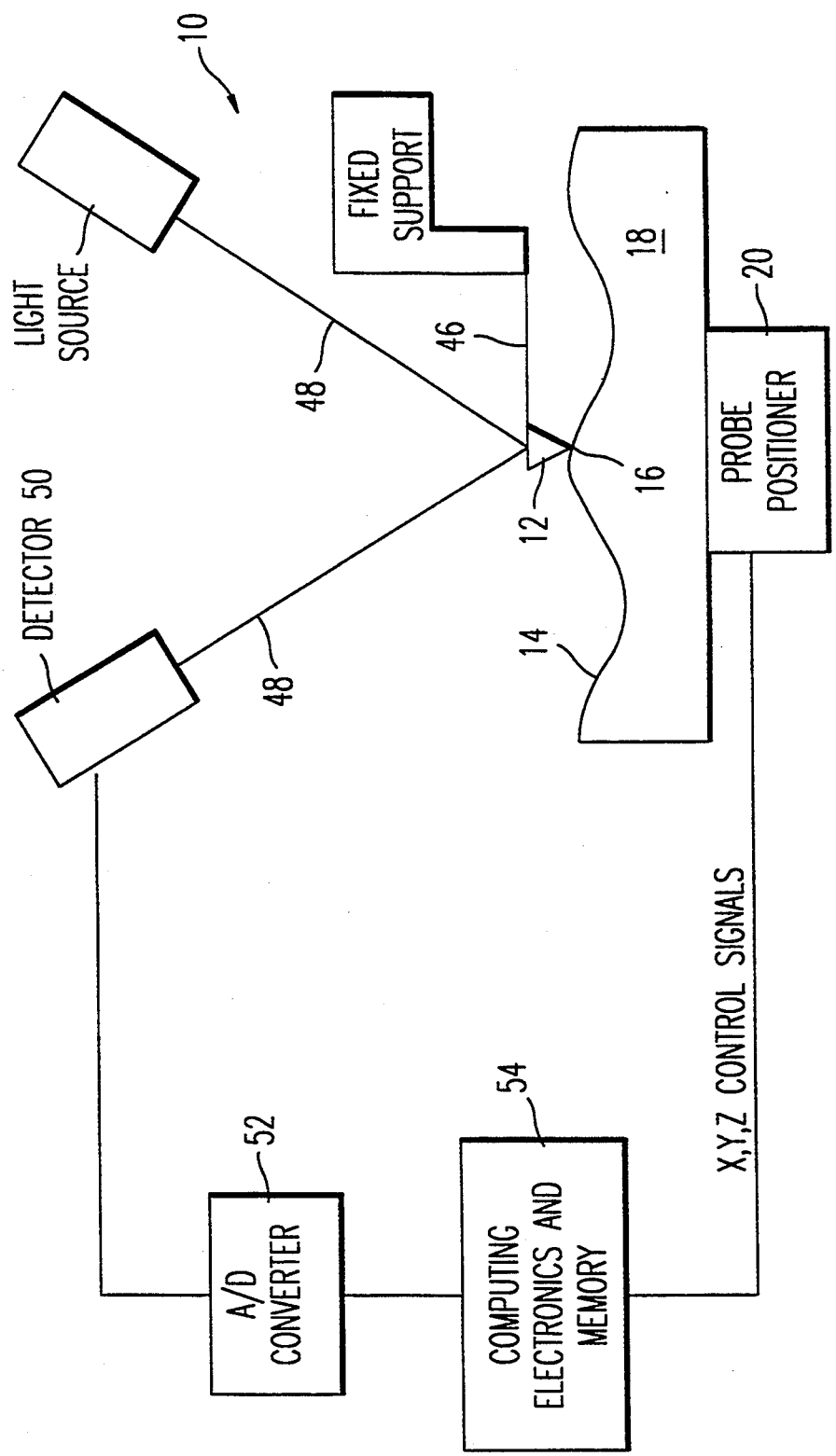
FIG. 2 is a simplified functional block diagram of the probe positioning apparatus of a prior art contact mode atomic force microscope.

According to the present invention, the AFM is then operated at or near a cantilever resonance with sufficient amplitude that upon the probe striking the surface, the amplitude of oscillation of the probe is affected and the probe does not stick to the surface. A preferred version of this invention can be practiced on the AFM of FIG. 3. In FIG. 3, the tip is driven at a known amplitude and frequency oscillation, which is typically near a cantilever resonance. The amplitude, $A_o$, of this oscillation is detected by the deflection detector of FIG. 3, which is of the type shown in FIG. 2 and described by Hansma et al. When the tip is sufficiently far away from the surface, it will oscillate at the free amplitude, $A_o$, as shown in FIG. 7. The amplitude is measured in the AFM of FIG. 3 as an RMS value of the AC deflection detector signal. As shown in FIG. 7, when the tip is brought closer to the surface, striking the surface will limit, typically due to damping, the oscillatory motion. The amount of change is measurable as a decreased RMS value, $A_s$. This modified amplitude value may be used as a setpoint in the manner of other above described SPM's, such that as the tip is scanned laterally, the cantilever height may be adjusted with feedback to keep the RMS setpoint, $A_s$, at a constant value. Alternatively, changes in the amplitude of oscillation themselves can be used as a direct measure of surface topography. Thus, an image of the surface may be generated. The preferred embodiment uses a digital processor to provide the servo control by means of feedback programs executed by the processor. An analog feedback system is also possible. Strain gauges, such as resistive or piezo-resistive strain gauges or piezoelectric elements built into the cantilever arm, may be employed in place of the optical deflector detector shown.

Figure 4:
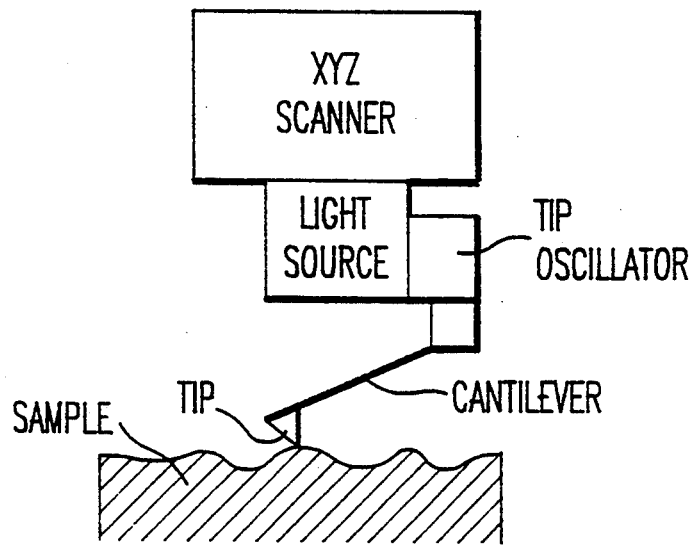
FIG. 4 is a block diagram of another type of AFM which may use the present invention.

As shown in FIG. 4, this version of the invention may also be implemented with other types of AFM's. For instance, the Compact AFM, disclosed in U.S. patent application Ser. No. 07/687,684, filed April 19, 1991 and now Pat. No. 5,189,906 describes an AFM where the probe is scanned rather than the sample. This AFM has provision to attach the probe to a separate positioner, which may be used to impart the oscillation, such that a setpoint may be established for contact with the surface.

This preferred embodiment of the invention has several advantages. This AFM can be operated with extremely light tapping forces. In general, the inventors have found that even using relatively stiff levers, on the order of 10's of neutrons per meter in order to give high frequency oscillations such as up to 2 MHz, the forces on the sample are still extremely light. For instance, it is easy to establish a setpoint that is 10 nm less than the free oscillation amplitude, which may be on the order of 100 nm. Thus the energy in the lever oscillation is much higher than that lost in each cycle by striking the surface. A conservative estimate of the actual force imparted to the surface is to assume the contact is inelastic and therefore the bending of the lever due to surface contact is just the amplitude gained in one cycle, approximately $(A_o-A_s)/Q$, where Q is the quality factor of the lever. Typical silicon levers have Q's of 100 to 1000, so for a setpoint 10 nm below the free amplitude of 100 nm the force per strike is 0.1 to 1 nanonewtons for a cantilever with a force constant of 10 newtons/meter. A contact mode AFM is limited to a contact force of about 50 nN in air due to the fluid layer attraction, and this can be reduced to about 1 nN operating in a liquid cell. So the present invention has extremely light contact forces and no shear forces at all. Thus, this technique is comparable to the non-contact mode in terms of surface damage, and operates much more stably and reliably. This mode effectively eliminates the effect of the surface fluid layer which limits the utility of both prior art contact and non-contact mode systems, and the advantage of operation under liquid disappears for many applications.

The invention also can achieve very high resolution. The oscillation can potentially be at very high frequency since only a very small lever must be driven, and because the low striking forces allow stiff levers to be used. This mode does not require resonant operation per se, but requires sufficient energy in the oscillation to overcome the stickiness of the surface. Thus in practice, resonant operation is necessary, but the higher harmonies of the resonant frequency may be usable. The inventors have successfully operated the invention at oscillation frequencies of up to 2 MHz. It is straightforward to oscillate at a frequency that for typical scan sizes and rates will cause the tip to strike the surface many times before it has displaced laterally by one tip diameter. Thus the lateral resolution is only limited by the tip size, which is much better resolution than achieved by prior art non-contact AFM's, whose resolution is determined by the height of the tip above the surface. Since the vertical deflection detector for a typical AFM has sub-nanometer resolution, the invention will also be able to maintain the setpoint to subnanometer accuracy. The invention has been successfully used to measure surface roughness on polished silicon of under 1 angstrom RMS. The invention does not depend on Van der Waals interactions like the non-contact AFM to sense the surface, so it can operate under fluids for samples that need to be hydrated.

As can be seen from FIG. 8, the region of stable operation for the invention is forgiving, but if the probe does become stuck to the surface there is significant hysteresis in the recovery process. The probe has to be pulled away a relatively large distance, then it will abruptly restart the free oscillation. It then has to be brought back to the operating height. If the setpoint amplitude $A_s$ is too low, the tip may remain oscillating in the surface fluid layer with the feedback system not trying to pull the tip loose. The inventors have found that this type of scanning is stable, but gives low resolution similar to the non-contact method. The amplitude-distance curve of FIGS. 6 and 8 is of great utility in evaluating the stickiness of a surface and choosing an $A_o$ and an $A_s$ that will produce satisfactory operation.

The preferred method of operation is to select a free amplitude $A_o$ such that the amplitude versus approach curve of FIG. 8 gives a continuous, stable decrease of amplitude as the lever is brought closer to the surface. The amplitude will depend on the tip sharpness, cantilever stiffness, and the sample surface, as well as current environmental conditions such as humidity. Preferably, in an SPM where this curve may be produced, displayed and adjusted in real time, the operator can determine a suitable free amplitude by starting with a low amplitude and increasing it until the curve changes shape from a curve like FIG. 6 to a curve like FIG. 8. The preferred setpoint for high resolution imaging topography is an $A_s$ that is greater than the amplitude at which the cantilever breaks free on the withdraw portion of FIG. 8. This point is labeled $A_p$. If one operates at a setpoint above $A_p$, then if the tip does become stuck to the surface, the feedback will return to a condition where the lever is free of the surface liquid layer.

Using the amplitude-distance curve to evaluate and select operating parameters is important because the actual behavior of the lever is sample and condition dependent. For most samples, for some value of $A_o$, a curve such as FIG. 8 may be produced, and if an $A_s$ is Selected greater than $A_p$, stable operation will result in the imaging mode. However, some combinations of sample and conditions will not allow an amplitude-distance curve such as shown in FIG. 8. Either the pull-off curve or the approach curve may not follow the same pattern. For instance, the pull-off may be abrupt, indicating that the lever is affected little by the fluid layer on pull-off. This condition does not usually affect stable operation. Another condition may be an abrupt capture on approach, similar to small oscillation (non-contact) operation. For this case, it is vital to adjust the parameters to achieve as wide an operating region as possible.

Figure 11:
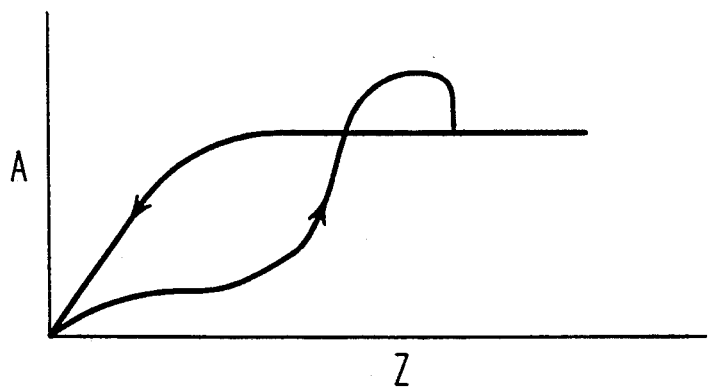
FIG. 11 is a graph of an amplitude-distance curve that illustrates the behavior of the probe oscillation in a preferred embodiment of the present invention as a function of probe height above a surface in a mode where the probe oscillates within the surface fluid layer.

Moreover, the amplitude-distance curve may be used to set operating parameters that result in interesting and potentially useful modes. If $A_s$ is set lower than $A_p$ for a sample that has an amplitude-distance curve like FIG. 8, then if the lever can be initially pushed into the sticking position, the feedback loop will then maintain an imaging mode where the tip is oscillating within the fluid layer, and not actually in contact with the surface. This is a very stable non-contact mode. In this mode the instrument is essentially imaging the surface fluid layer, and the topography of this layer compared to the topography of the surface may provide useful information. The resolution is lower than when striking occurs, but is comparable to the less stable prior art non-contact mode where the tip is above the layer and the free amplitude oscillation is small. Another potential mode occurs if the lever is oscillated below resonance when the tip is far from the surface. When the tip is withdrawn, the fluid layer attached to the lever will lower the resonance such that the oscillation response to the drive signal may be actually larger than the free amplitude because the drive signal is now closer to resonance. This case is illustrated in FIG. 11. The inventors have noticed that this mode is highly sample dependent, and thus may contain useful information about the surface fluid layer. Although both of these modes should be avoided for reliable topographic measurements, they illustrate the usefulness of the amplitude-distance curve to intelligently select operating parameters, and the potential diversity of applications for the invention.

Figure 12:
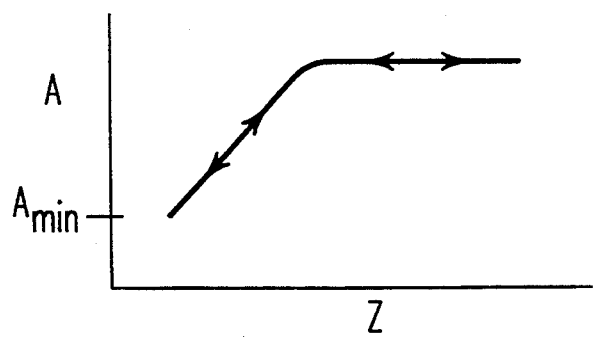
FIG. 12 is a graph of an amplitude-distance curve that stops before the amplitude decreases below a predetermined point.

Because stiff levers are typically used for the invention for high frequency operation, the inventors have found it is often useful when generating amplitude-distance curves to limit the distance over which the curve is obtained. If the lever is pushed sufficiently far into the surface that oscillation has ceased, then the force on the sample is simply the displacement of the lever times the spring constant. Typical levers suitable for this invention have spring constants many times those used in conventional contact AFM's, so the force exerted in an amplitude-displacement curve at the end where oscillation ceases can be very large. The sample and the cantilever may be damaged by the operation of obtaining the curve. Thus, the amplitude may be monitored during the distance modulation, and the lever only pushed into the sample until a predetermined decrease in amplitude is observed, and then pulled away. For instance, the digital controller that operates the scanner can be programmed to move the sample toward the cantilever until a certain amplitude or fraction of the free amplitude is reached and then caused the sample to be retracted. The user could enter the target amplitude into the controller. Such a curve is shown in FIG. 12. The probe is pushed into the sample until an amplitude $A_{min}$ is observed, and no further. The setpoint can be picked on the sloped part of the curve $A_{min}$. This technique will prevent damage to tip and sample during the amplitude-distance curve operation.

The invention can also be used to measure attractive force distributions such as magnetic fields, in a mixed mode operation, using both the invention and the prior art noncontact mode. For instance, if a magnetic tip is used, and a surface is scanned with alternating magnetic and non-magnetic regions, the reduction in amplitude will be affected not only by the tip striking the surface but also by the effect of the magnetic force gradient on the resonant frequency of the cantilever, as described above (if the driving frequency is slightly above the resonant frequency). Over areas where the magnetic field decreases the oscillation amplitude below the setpoint, the feedback will raise the lever to maintain the setpoint, such that the magnetic areas will appear in the image as regions of increased height. If the magnetic field interaction is strong enough, the tip will no longer be striking the surface over the magnetic regions. In regions with no magnetic field, the feedback will return the tip to the striking mode to maintain the setpoint. This same technique is potentially useful to measure other parameters such as electric field, which with appropriate tips and electronics may also exert force interactions on oscillating probes.

Figure 13:
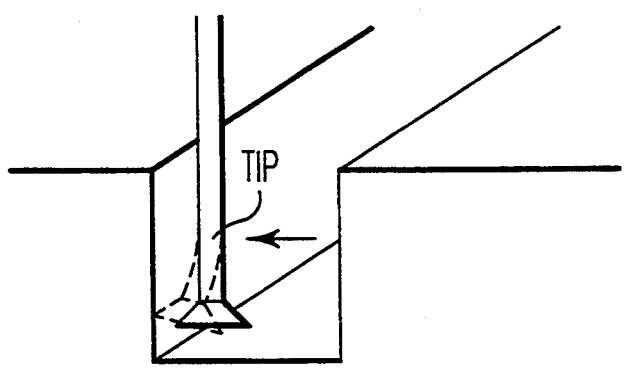
FIG. 13 is an illustration of how a probe is pulled into a steep wall in the prior art contact AFM.

Another problem with contact mode prior art AFM's is that they have poor performance when measuring steep sample features, such as trenches on integrated circuits. There are at least two problems associated with steep features. The first is that when the tip scans into the feature it twists laterally, and this lateral twist is not detected or interpreted properly by the vertical deflection detector. The second problem is that suitable tips need to be long and narrow to get into the grooves so these tips are not very stiff laterally. As the tip approaches the sidewall, attractive forces tend to pull the tip toward the surface as shown in FIG. 13, and the tip tends to stick to the surface because of surface tension as the scan moves away from a wall. Both of these effects distort measurements of linewidth or step height that need to be made to accuracies of fractions of a percent. Since the sticking may depend on ambient conditions, such as humidity, the measurements can vary from day to day. A modification of the invented technique can be used for such measurements.

Figure 9A:
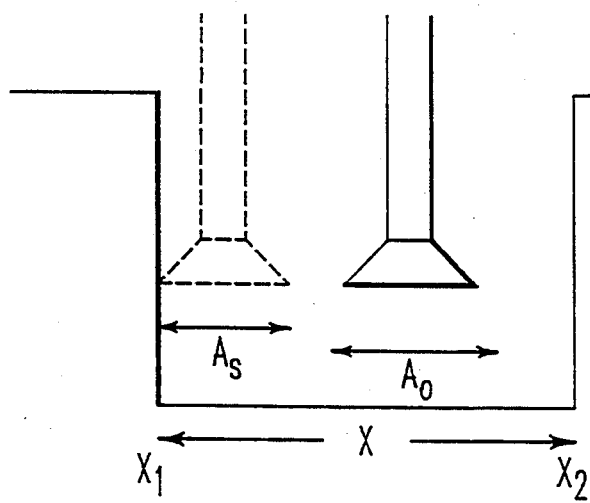
FIG. 9 is an illustration of how the present invention may be used to achieve improved performance when measuring surfaces with steep walls and trenches.
Figure 9B:
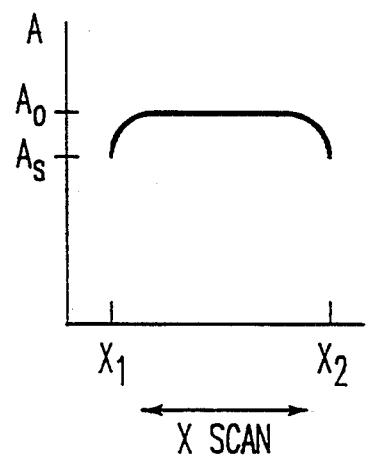

As shown in FIG. 9, the oscillation can be done in a horizontal direction, using a probe with a suitable shape in a trench or near any step. If the probe is scanned laterally in the trench or near a step while oscillating laterally, the free oscillation amplitude will decrease when the wall is touched. Thus a setpoint for horizontal motion may be established that causes the probe to contact a trench or step sidewall with a series of taps so that measurement accuracy will be unaffected by attractive forces or sticking. This setpoint can be used to maintain the probe at a sidewall with low force and no sticking. The probe could then be scanned vertically and servoed laterally to maintain the setpoint in order to profile the wall. Alternatively, linewidth could be measured if the probe is scanned back and forth across a trench, such that the lateral motion reverses direction when a wall is encountered, as determined by the oscillation amplitude reducing to a setpoint at the walls. This process could be repeated as the probe is scanned along the trench to measure variations in linewidth, or a combination of lateral and vertical profiling could be used.

Figure 10:
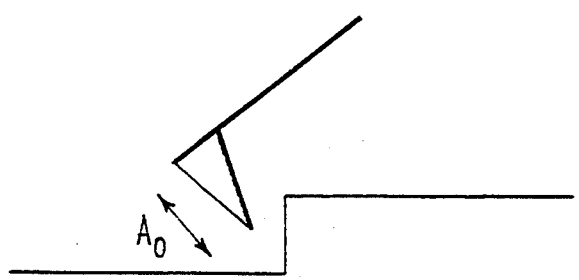
FIG. 10 is an illustration of an alternative approach where the present invention may be used to achieve improved performance when measuring surfaces with steep walls and trenches.

Yet another technique to measure steep walls is shown in FIG. 10. If the lever is mounted at an angle to the surface, preferably greater than the half angle of the probe, and the probe is oscillated perpendicular to the lever, then the probe will scan along the surface until the wall is encountered, and will follow the wall up, because the oscillation setpoint will be affected both by the floor and the wall. Thus an x-z profile of the wall and floor will be produced. This approach will even work for undercut walls depending on the shape of the tip and nature of the undercut.

Figure 14A:
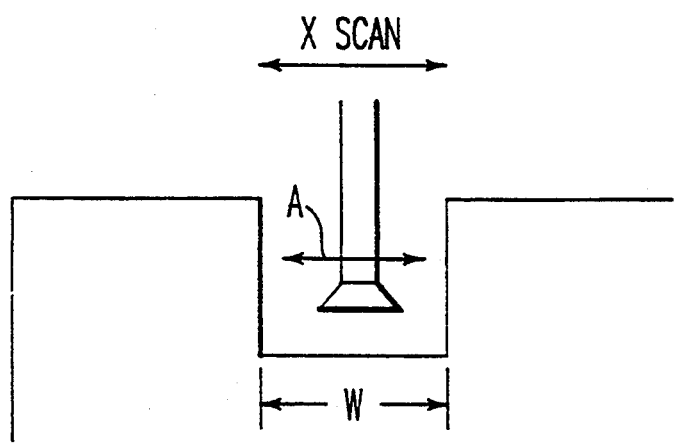
Figure 14B:
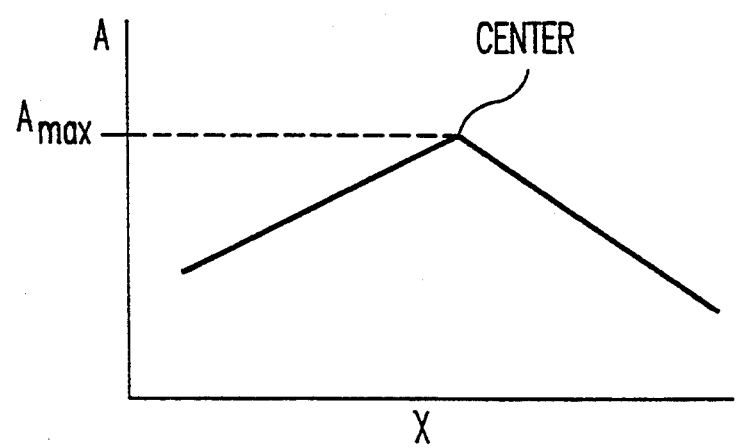

Another mode is to increase the amplitude of oscillation in a trench until the tip hits both sides. The tip could then be scanned laterally across the trench as shown in FIG. 14a so that the point of maximum oscillation is found. This maximum oscillation will be where the tip is in the center of the groove, hitting each side equally. This amplitude, $A_{max}$, shown in FIG. 14b, combined with the width of the tip, will give a measure of the width of the groove. One could then trace this cut vertically.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Leters Patent of the United States is:

1. In a method of operating an atomic force microscope including a probe including a probe tip mounted on one end of a lever arm and wherein the probe tip is scanned across the surface of a sample and data representative of the surface of the sample is gathered in relation to the positioning of the lever arm as the probe tip is scanned, the improvement comprising:

oscillating the probe tip at or near a resonant frequency of the probe or a harmonic of said resonant frequency and with a free oscillation amplitude $A_o$ sufficiently great so that the oscillating probe tip does not stick to the surface of the sample when the oscillating probe tip contacts the surface of the sample;

positioning the oscillating probe tip so that the oscillating probe tip repeatedly taps the surface of the sample with the probe tip repeatedly contacting and breaking contact with the surface of the sample without sticking to the surface of the sample;

translating the oscillating probe tip across the surface of the sample with the oscillating probe tip repeatedly tapping the surface of the sample so that the oscillation amplitude of the probe tip is stably affected due to changes in topography of the surface of the sample; and producing signals indicative of variations in the topography of the surface of the sample in relation to changes in the oscillation of the oscillating probe tip upon repeated tapping of the oscillating probe tip against the surface of the sample during translation of the oscillating probe tip across the surface of the sample.

2. In an atomic force microscope (AFM) wherein a probe including a probe tip mounted on a lever arm is scanned across the surface of a sample and data reflecting the surface of the sample is gathered in relation to positioning of the lever arm as the probe tip is scanned, the improvement comprising:

first transducer means for oscillating the probe tip with a free oscillation amplitude $A_o$ sufficiently great, so that the oscillating probe tip does not stick to the surface of the sample when the oscillating probe tip contacts the surface of the sample;

second transducer means for positioning the oscillating probe tip so that the oscillating probe tip repeatedly taps the surface of the sample, thereby repeatedly contacting and breaking contact without sticking to the surface of the sample, and and for translating the oscillating probe tip across the surface of the sample with the oscillating probe tip repeatedly tapping the surface of the sample such that the amplitude of oscillation of the probe tip is affected by repeatedly tapping the sample surface; and means for monitoring the oscillation of the probe tip during translating of the oscillating probe tip to produce a signal indicative of variations in the topography of the surface of the sample in relation to changes in the oscillation of the oscillating probe tip during tapping against the surface of the sample and translation across the surface of the sample.

3. The AFM according to claim 2, comprising:
   a fluid in which said sample surface and said probe are immersed.

4. The AFM according to claims 2 or 3, wherein said scanning means oscillates said probe at or near a resonant frequency of said probe.

5. The AFM according to claim 2, comprising:
   means for oscillating said probe laterally adjacent a step in the sample; and
   means for detecting the amplitude of oscillation of the probe tip resulting from the probe tip tapping the sidewall of the step.

6. The AFM according to claim 5, comprising:
   means for moving said probe vertically adjacent said step and obtaining a vertical profile of said step.

7. The AFM according to claim 5, wherein:
   said second transducer means comprises means for scanning said laterally oscillated probe between opposed steps of a trench; and
   said monitoring means comprises means for determining a width of the trench as a function of changes in the amplitude of oscillation of the probe tip as the probe tip taps said opposed steps of the trench.

8. The AFM according to claim 2, comprising:
   means for scanning said probe laterally across a trench while oscillating said probe and measuring a maximum amplitude of oscillation of said probe during said scanning; and means for determining a width of said trench as a function of the measured maximum amplitude of oscillation and the width of the probe tip.

9. The AFM according to claim 2, wherein:

said lever arm comprises a strain gauge or a piezoelectric gauge; and said means for determining data values determines data values in relation to an output of said stain gauge or piezoelectric gauge.

10. The AFM according to claim 2, wherein said monitoring means comprises:

means for determining data values as a function of changes in amplitude of oscillation of the probe tip.

11. The AFM according to claim 2, comprising:

feedback means for producing a control signal to control a distance between an end of said lever arm opposite said probe tip and said sample during translating of the probe tip to maintain the amplitude of oscillation of the probe tip essentially constant; and said monitoring means comprising means for producing said signal indicative of surface topography based on the control signal produced by said feedback means to maintain the amplitude of oscillation of the probe.

12. The AFM according to claim 11, comprising:

output means for outputting said control signal as a function of position of said probe tip during translating of said probe tip.

13. In a method of operating an atomic force microscope including a probe including a probe tip mounted on one end of a lever arm and wherein the probe tip is scanned across a sample surface including a surface fluid layer, and data rpresentative of topography of the sample is gathered in relation to the positioning of the lever arm as the probe tip is scanned, the improvement comprising:

oscillating the probe tip at a free oscillation amplitude $A_0$ equal to or greater than 20 nanometers;

interacting the oscillating probe tip with the sample surface so that the oscillating probe tip contacts and breaks contact with the sample surface without sticking to the sample surface to produce changes in the oscillation as a function of the topography of the sample; and producing signals representative of the topography of the sample in relation to the changes in the oscillation produced in said interacting step.

14. The method according to claim 13, wherein the oscillating step comprises oscillating the probe tip at a frequency of oscillation which is at or near a resonant frequency of the probe.

15. The method according to claim 13, wherein:

said interacting step comprises controlling the distance between an opposite end of the lever arm opposite the probe tip and the sample so that the amplitude of oscillation of the probe tip is essentially constant during scanning of the probe tip; and said step of producing a signal comprises determining data values representative of the topography of the sample in relation to a control signal produced in said controlling step to maintain the amplitude of oscillation of the probe tip essentially constant.

16. The method according to claim 13, wherein said step of producing signals comprises:

determining data values representative of the topography of the sample in relation to changes in the amplitude of oscillation of said probe tip during scanning of said probe tip.

17. In a method of operating an atomic force microscope including a probe including a probe tip mounted on one end of a lever arm and wherein the probe tip is scanned across the surface of a sample and data representative of the surface of the sample is gathered in relation to the positioning of the lever arm as the probe tip is scanned, the improvement comprising:

oscillating the probe to produce a free oscillation amplitude Ao of the probe tip;

providing a body of fluid on the surface of the sample with a depth sufficiently great to cover said oscillating probe;

positioning the oscillating probe tip in the body of fluid so that the oscillating probe tip repeatedly taps the surface of the sample with the probe tip repeatedly contacting and breaking contact with the surface of the sample without sticking to the surface of the sample;

translating the oscillating probe tip in said body of fluid across the surface of the sample with the oscillating probe tip repeatedly tapping the surface of the sample so that the oscillation amplitude of the probe tip is stably affected due to changes in topography of the surface of the sample; and producing signals indicative of variations in the topography of the surface of the sample in relation to changes in the oscillation of the oscillating probe tip upon repeated tapping of the oscillating probe tip against the surface of the sample during translation of the oscillating probe tip across the surface of the sample.

18. The method according to claim 17, wherein the free amplitude $A_o$ is selected to be greater than 10 nanometers.

19. The method according to claim 18, wherein the free amplitude $A_o$ is selected to be greater than or equal to 20 nanometers.

20. The method according to claim 1 or 17, wherein said oscillating step comprises:

oscillating said probe tip at a harmonic resonant frequency of said probe of less than or equal to 2 MHz.

21. The method according to claims 1 or 17, wherein said step of producing signals comprises:

determining data values representative of the surface of the sample as a function of change in amplitude of oscillation of said probe tip.

22. The method according to claims 1 or 17, comprising:

controlling the distance between an opposite end of the lever arm opposite the probe tip and the sample so that the amplitude of oscillation of the probe tip is maintained essentially constant during said translating steps; and said signal.producing step comprising determining data values representative of the topography of the surface of the sample based on a control signal produced in said controlling step to maintain the amplitude of oscillation of the oscillating probe tip essentially constant.

23. The method according to claims 1 or 17, comprising:

a) oscillating said probe tip laterally adjacent a step in said sample; and b) detecting the amplitude of oscillation of the probe tip as the probe tip taps a sidewall of the step.

24. The method according to claim 23, comprising:
mowing said probe tip vertically adjacent said step and repeating said steps a) and b) to obtain a vertical profile of said step. in said sample; and
b) detecting the amplitude of oscillation of the probe tip as the probe tip taps a sidewall of the step.

25. The method according to claim 23, comprising:
scanning said probe between opposed steps of a trench;
determining a width of the trench in relation to the amplitude of oscillation of the probe tip as the probe tip taps the opposed steps of the trench.

26. The method according to claims 1 or 17, comprising:
scanning said probe tip laterally across a trench while oscillating said probe tip laterally and measuring a maximum amplitude of oscillation of said probe tip during said scanning; and
determining a width of said trench as a function of the measured maximum oscillation.

27. The method according to claim 1 or 17, comprising:
using a probe tip which includes a magnetic material; and
measuring a change in the amplitude of oscillation of the probe tip due to a magnetic field at the surface of the sample to obtain a map of a magnetic characteristic of the sample surface.

28. The method according to claims 1 or 17, comprising:
using a lever arm having a strain gauge or a piezoelectric gauge; and
detecting a deflection of said lever arm in relation to an output of said strain gauge or said piezoelectric gauge.

* * * * *